United States Patent
Fujihira et al.

(10) Patent No.: US 10,461,593 B2
(45) Date of Patent: Oct. 29, 2019

(54) ROTARY ELECTRIC MACHINE

(71) Applicant: HONDA MOTOR CO., LTD., Tokyo (JP)

(72) Inventors: Makoto Fujihira, Wako (JP); Toshiyuki Nagumo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 271 days.

(21) Appl. No.: 15/594,656

(22) Filed: May 15, 2017

(65) Prior Publication Data

US 2017/0373547 A1 Dec. 28, 2017

(30) Foreign Application Priority Data

Jun. 22, 2016 (JP) .................. 2016-123903

(51) Int. Cl.
*H02K 9/19* (2006.01)
*H02K 1/20* (2006.01)
*H02K 9/14* (2006.01)

(52) U.S. Cl.
CPC .............. *H02K 1/20* (2013.01); *H02K 9/14* (2013.01); *H02K 9/19* (2013.01)

(58) Field of Classification Search
CPC .. H02K 9/00; H02K 9/02; H02K 9/14; H02K 9/16; H02K 9/19; H02K 9/20; H02K 5/00; H02K 5/20
See application file for complete search history.

(56) References Cited

U.S. PATENT DOCUMENTS

2016/0056683 A1* 2/2016 Nakanishi ............... H02K 5/18
310/54

FOREIGN PATENT DOCUMENTS

| DE | 19928023 A1 * | 12/1999 | ............... H02K 9/19 |
|---|---|---|---|
| JP | 2006-296005 | 10/2006 | |
| JP | 2014-140276 | 7/2014 | |
| JP | 2014-236613 | 12/2014 | |
| JP | 2015-073390 | 4/2015 | |

OTHER PUBLICATIONS

Japanese Office Action for corresponding JP Application No. 2016-123903 (w/ English machine translation), dated Jan. 30, 2018.

* cited by examiner

*Primary Examiner* — Tran N Nguyen
(74) *Attorney, Agent, or Firm* — Mori & Ward, LLP (57) ABSTRACT

The rotary electric machine includes a stator, a passage, an inlet opening, an outlet opening, and a partition. The stator has an outer periphery. The passage is provided around the outer periphery. A cooling medium is to flow through the passage. The inlet opening is connected to the passage. The cooling medium is to be supplied to the passage via the inlet opening. The outlet opening is connected to the passage. The cooling medium is to be discharged from the passage via the outlet opening. The inlet opening and the outlet opening divide the passage into a longer passage and a shorter passage shorter than the longer passage. The partition is provided in the shorter passage and comprises an elastic material to contact with an inner surface of the shorter passage so as to restrict a flow of the cooling medium.

14 Claims, 6 Drawing Sheets

Fig.9

ROTARY ELECTRIC MACHINE

CROSS-REFERENCE TO RELATED APPLICATIONS

The present application claims priority under 35 U. S. C. § 119 to Japanese Patent Application No. 2016-123903, filed Jun. 22, 2016. The contents of this application are incorporated herein by reference in their entirety.

BACKGROUND

1. Field

The present invention relates to a rotary electric machine.

2. Description of the Related Art

A rotary electric machine that includes a stator and a housing accommodating the stator is used in a hybrid vehicle and the like. For example, a rotary electric machine is proposed in which a coolant passage is formed between a stator and a housing (see Japanese Patent Application Publication No. 2006-296005, for example).

In some rotary electric machines including a coolant passage, a straightening structure such as a partition member that specifies a flow direction of the coolant is provided in the passage (see Japanese Patent Application Publication No. 2014-140276, for example).

SUMMARY

According to one aspect of the present invention, a rotary electric machine includes an annular stator, a ring-like passage, an admission opening, and a discharge opening. A cooling medium flows in a circumferential direction of the stator on an outer peripheral side of the stator through the ring-like passage through. The admission opening and the discharge opening of the cooling medium are connected to the ring-like passage. The admission opening and the discharge opening are provided in different positions in the circumferential direction. In the ring-like passage, a partition member that interferes with at least a part of the flow of the cooling medium is provided in a shorter channel, of channels in one and the other of the circumferential direction directed toward the discharge opening from the admission opening. The partition member is at least partially configured of an elastic material, and abuts on an inner surface of the ring-like passage.

According to another aspect of the present invention, a rotary electric machine includes a stator, a passage, an inlet opening, an outlet opening, and a partition. The stator has an outer periphery. The passage is provided around the outer periphery. A cooling medium is to flow through the passage. The inlet opening is connected to the passage. The cooling medium is to be supplied to the passage via the inlet opening. The outlet opening is connected to the passage. The cooling medium is to be discharged from the passage via the outlet opening. The inlet opening and the outlet opening divide the passage into a longer passage and a shorter passage shorter than the longer passage. The longer passage and the shorter passage connect the inlet opening and the outlet opening, respectively. The partition is provided in the shorter passage and includes an elastic material to contact with an inner surface of the shorter passage so as to restrict a flow of the cooling medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, an embodiment of the present invention will be described with reference to the drawings.

Figure 1:
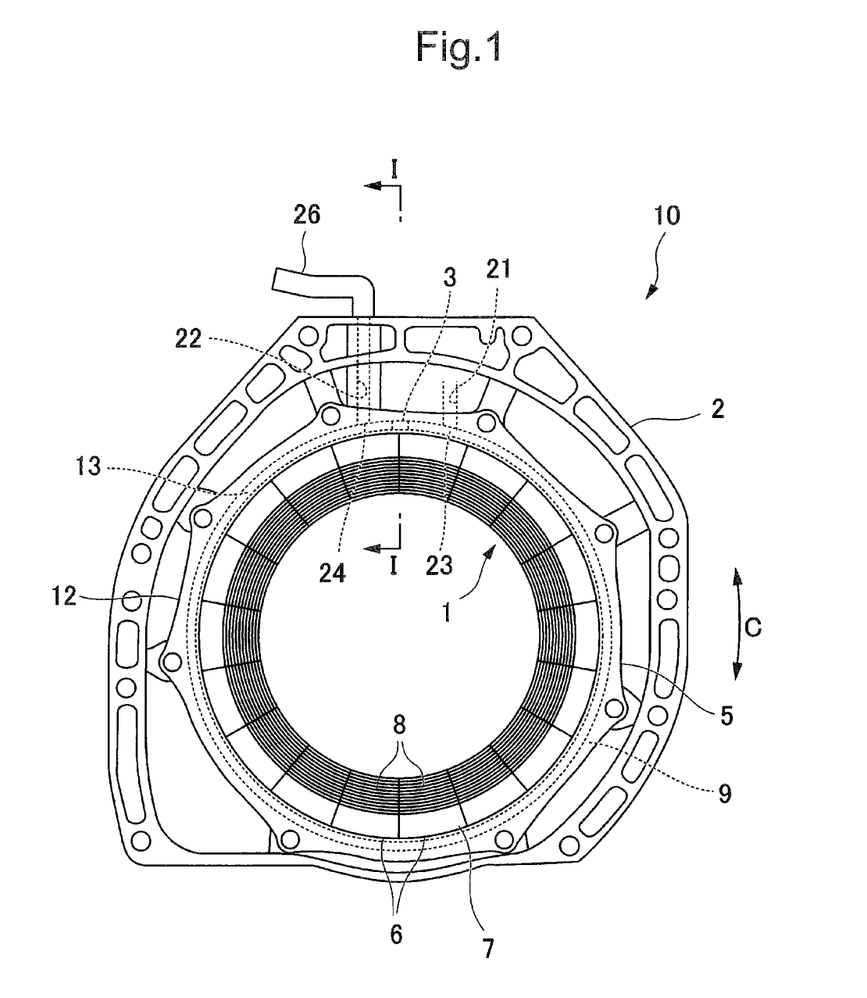
FIG. 1 is a front view of a rotary electric machine of an embodiment.
Figure 2:
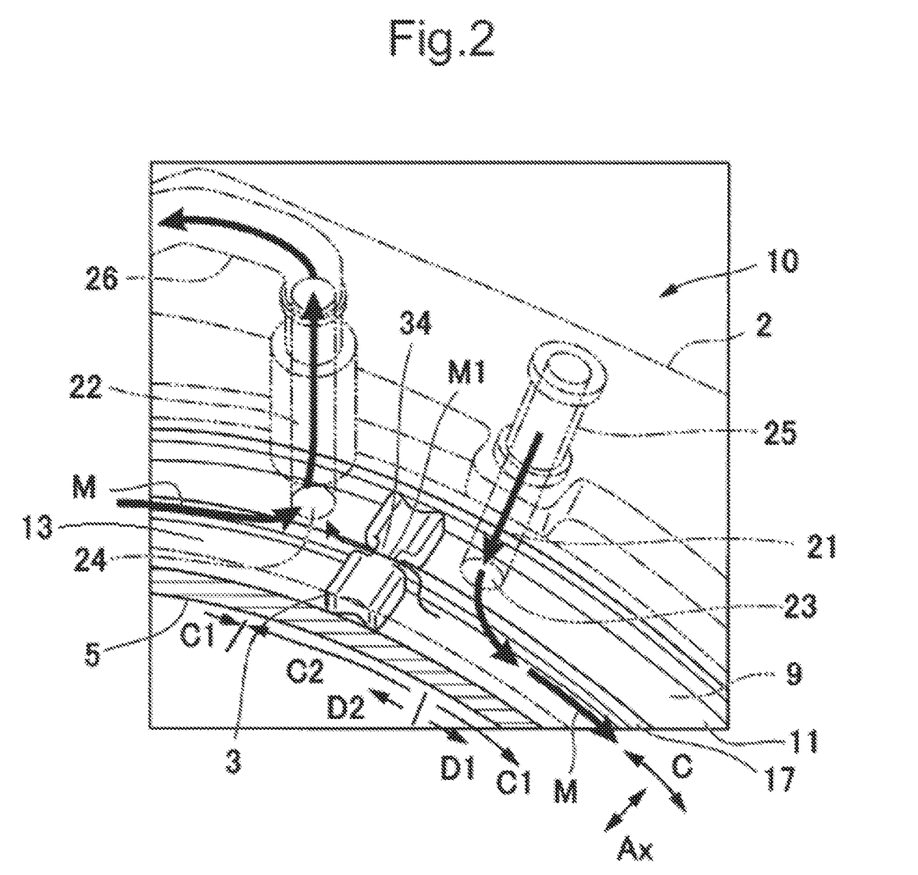
FIG. 2 is a partial perspective view of a stator holder and a housing of the rotary electric machine of FIG. 1.
Figure 3:
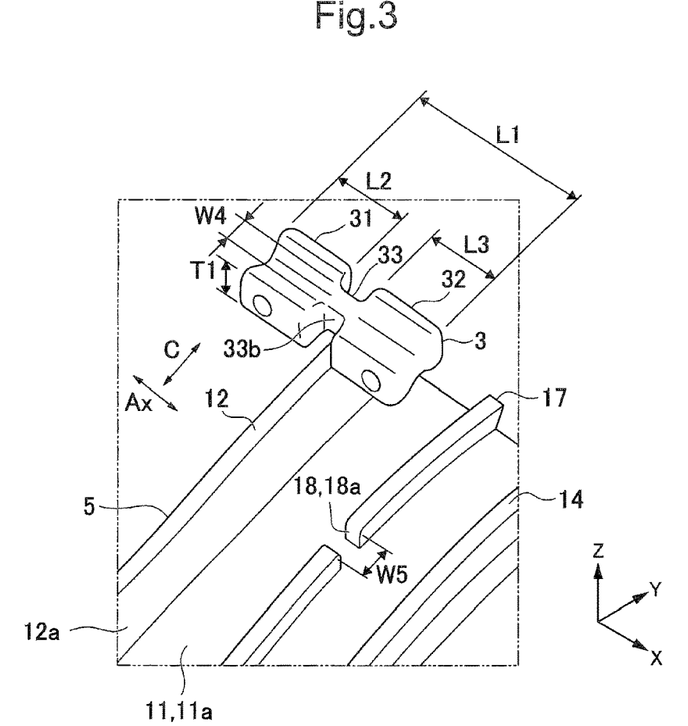
FIG. 3 is a perspective view of the stator holder and a partition member of the rotary electric machine of FIG. 1.
Figure 4:
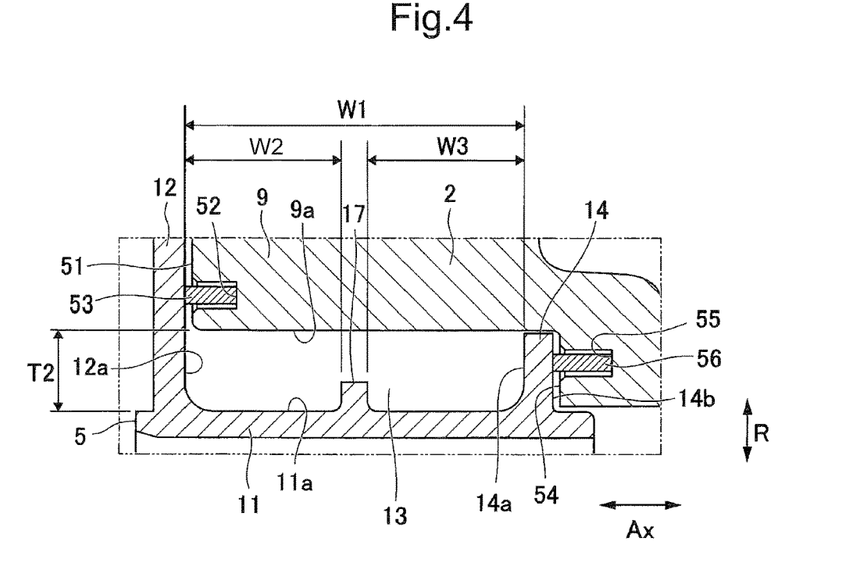
FIG. 4 is a partial cross section of the stator holder and the housing of the rotary electric machine of FIG. 1.

FIG. 1 is a front view of a rotary electric machine 10 of an embodiment. FIG. 2 is a partial perspective view of a stator holder 5 and a housing 2. FIG. 3 is a perspective view of the stator holder 5 and a partition member 3. FIG. 4 is a partial cross section of the stator holder 5 and the housing 2. FIGS. 5 to 9 are diagrams showing the stator holder 5 and the partition member 3. Arrow Ax indicates a direction along the axis center of a stator 1. Arrow R indicates the radial direction of the stator 1. Arrow C indicates a direction (circumferential direction) around the axis center of the stator 1.

For example, the rotary electric machine 10 may be used for vehicle driving and energy regeneration in an electric vehicle, a hybrid vehicle, or the like. An unillustrated rotor is placed in a rotatable manner on the inner side of the stator 1.

As shown in FIGS. 1 to 3, the rotary electric machine 10 includes the stator 1, the housing 2, the partition member 3, and the stator holder 5.

The stator 1 has an annular stator core 7 formed of multiple divided core pieces 6, and a coil lead wire 8 wound around the divided core pieces 6.

The housing 2 includes a tubular portion 9 that has a columnar internal space. The stator 1 and the stator holder 5 can be stored inside the tubular portion 9. The housing 2 is a tubular surrounding member provided on the outer peripheral side of the stator 1 and the stator holder 5.

The stator holder 5 is an annular body that has a cylindrical portion 11 holding the stator 1, and a ring-like flange portion 12 protruding radially outward from an end part of the cylindrical portion 11. The stator holder 5 holds the stator 1 from the radially outer side of the stator 1, by press-fitting and fixing the stator 1 into the cylindrical portion 11.

The flange portion 12 can be fixed to the housing 2 with fixtures such as bolts, with the cylindrical portion 11 inserted into the tubular portion 9 of the housing 2.

As shown in FIGS. 3 and 4, a ring-like wall portion 14 extending along the circumferential direction is formed in an outer peripheral surface 11a of the cylindrical portion 11 of the stator holder 5. The ring-like wall portion 14 protrudes radially outward from the outer peripheral surface 11a of the cylindrical portion 11. The ring-like wall portion 14 is spaced apart from the flange portion 12 in the axis center direction.

A guide protrusion 17 extending along the circumferential direction is formed between the flange portion 12 and the ring-like wall portion 14, on the outer peripheral surface 11a of the cylindrical portion 11 of the stator holder 5. The guide protrusion 17 protrudes radially outward from the outer peripheral surface 11a. The guide protrusion 17 is spaced apart from the flange portion 12 and the ring-like wall portion 14 in the axis center direction.

The guide protrusion 17 protrudes less than the flange portion 12 and the ring-like wall portion 14, and does not reach an inner peripheral surface 9a of the tubular portion 9 of the housing 2. A distance W2 between the flange portion 12 and the guide protrusion 17 in the axis center direction is preferably the same as a distance W3 between the ring-like wall portion 14 and the guide protrusion 17 in the axis center direction.

The guide protrusion 17 has a function of straightening the flow of a cooling medium M inside a ring-like passage 13.

As shown in FIG. 3, a cutout 18 (locking part) is formed in the guide protrusion 17. The cutout 18 is a recess formed radially inward from a protruding end of the guide protrusion 17, and has an inner surface 18a extending along the radial direction, for example.

As shown in FIG. 4, the ring-like passage 13 is formed between the outer peripheral surface of the stator holder 5 and the inner peripheral surface of the housing 2. To be specific, the ring-like passage 13 is formed of an inner surface 12a of the flange portion 12, the outer peripheral surface 11a of the cylindrical portion 11, an inner surface 14a of the ring-like wall portion 14, and the inner peripheral surface 9a of the tubular portion 9 of the housing 2. The ring-like passage 13 is formed over the entire periphery of the stator 1 along the circumferential direction (direction around the axis center) thereof.

As shown in FIG. 2, an admission passage 21 and a discharge passage 22 of the cooling medium M are formed in the housing 2. The admission passage 21 is connected to the ring-like passage 13 through an admission opening 23 formed in the tubular portion 9. The discharge passage 22 is connected to the ring-like passage 13 through a discharge opening 24 formed in the tubular portion 9.

The admission opening 23 and the discharge opening 24 are provided in different positions in the direction in which the ring-like passage 13 extends (circumferential direction of stator 1).

Channels of the ring-like passage 13 from the admission opening 23 to the discharge opening 24 include a first channel C1 in one circumferential direction (first circumferential direction D1), and a second channel C2 in the other circumferential direction (second circumferential direction D2).

In FIG. 2, the first channel C1 is a clockwise channel from the admission opening 23 to the discharge opening 24, and is longer than the anticlockwise second channel C2 that is the shortest channel from the admission opening 23 to the discharge opening 24.

Figure 5:
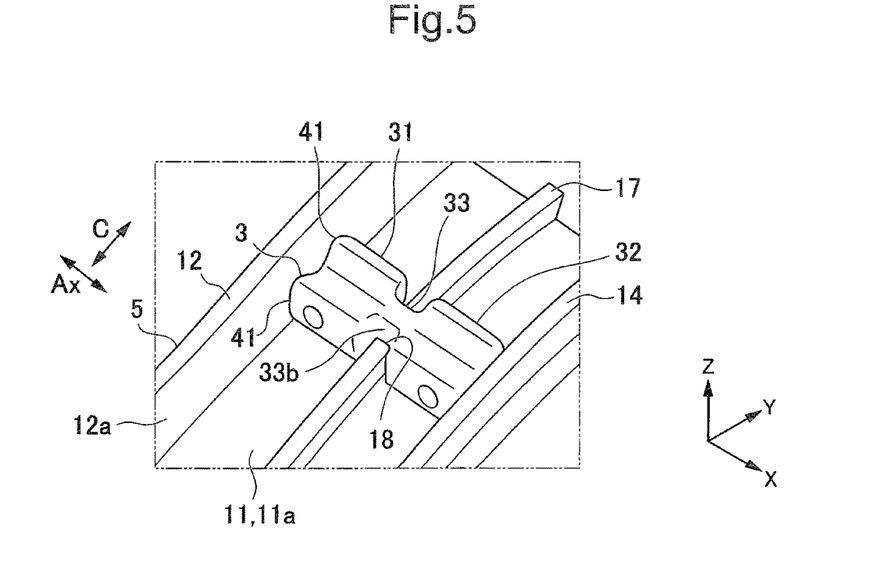
FIG. 5 is a perspective view of the stator holder and the partition member of the rotary electric machine of FIG. 1.
Figure 6:
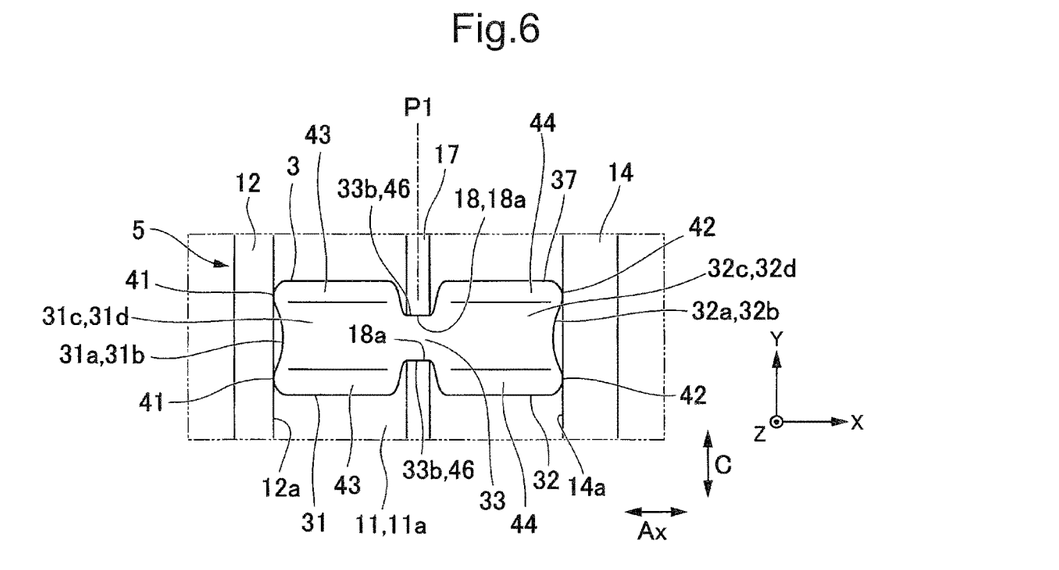
FIG. 6 is a plan view of the stator holder and the partition member of the rotary electric machine of FIG. 1.

As shown in FIGS. 5 and 6, the partition member 3 is attached to the outer peripheral surface 11a of the cylindrical portion 11 of the stator holder 5.

The partition member 3 includes a first main portion 31, a second main portion 32, and a connection portion 33 that connects these parts.

In the following description, direction X is the longitudinal direction of the partition member 3. Direction Y is a direction perpendicular to direction X, and is the cross direction of the partition member 3. Direction Z is a direction perpendicular to directions X and Y, and is the thickness direction of the partition member 3. Plan view is a view of the partition member 3 in the thickness direction (direction Z).

The main portions 31, 32 are formed into rectangular thick plates in plan view. Recesses 31b, 32b are formed in parts of outer end surfaces 31a, 32a of the main portions 31, 32 including the centers in the cross direction (direction Y), respectively. The outer end surfaces are end surfaces of the main portions in the longitudinal direction (direction X). The recesses 31b, 32b are curved recesses (e.g., circular arcs) in plan view, and are formed over the entire thickness direction (direction Z) of the main portions 31, 32.

A pair of outer end contact portions 41, 41 that bulge further outward in direction X than other parts are formed in the outer end surface 31a of the first main portion 31. The outer end contact portions 41, 41 are separated in the cross direction (direction Y) by the recess 31b. A pair of outer end contact portions 42, 42 that bulge further outward in direction X than other parts are formed in the outer end surface 32a of the second main portion 32. The outer end contact portions 42, 42 are separated in the cross direction (direction Y) by the recess 32b.

The outer end contact portions 41, 42 are formed over the entire thickness direction (direction Z) of the main portions 31, 32.

Figure 9:
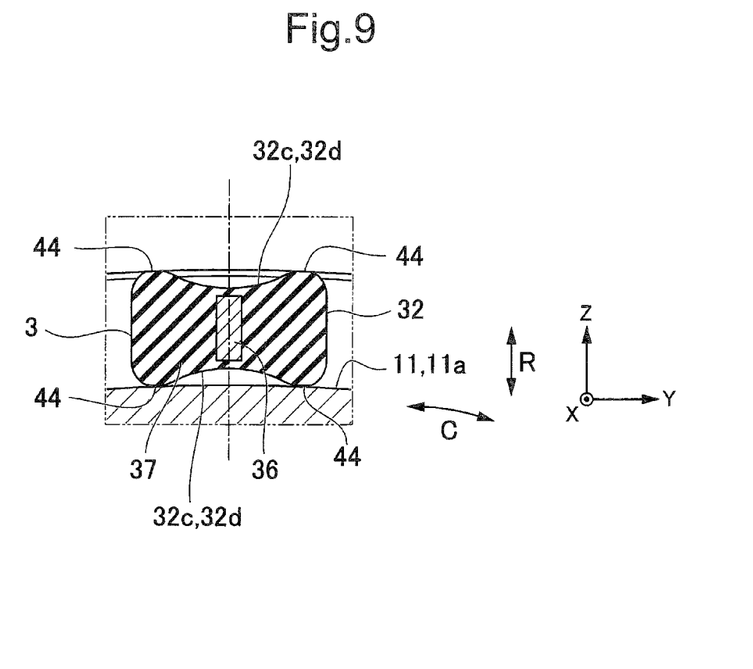
FIG. 9 is a diagram showing the stator holder and the partition member of the rotary electric machine of FIG. 1, and is a III-III section of FIG. 7.

As shown in FIGS. 6 and 9, recesses 31d, 31d are respectively formed in parts of one and the other surface (principal planes 31c, 31c) of the first main portion 31 including the centers in the cross direction (direction Y). The recesses 31d, 31d are curved recesses (e.g., circular arcs) in a cross section perpendicular to the longitudinal direction (direction X), and are formed over the entire longitudinal direction of the main portion 31.

A pair of principal plane contact portions 43, 43 that bulge further outward in the thickness direction (direction Z) than other parts are formed in the principal planes 31c, 31c. The principal plane contact portions 43, 43 are separated in the cross direction (direction Y) by the recesses 31d, 31d. The principal plane contact portions 43, 43 are formed over the entire longitudinal direction (direction X) of the main portion 31.

Recesses 32d, 32d are respectively formed in parts of one and the other surface (principal planes 32c, 32c) of the second main portion 32 including the centers in the cross direction (direction Y). The recesses 32d, 32d are curved recesses (e.g., circular arcs) in a cross section perpendicular to the longitudinal direction (direction X), and are formed over the entire longitudinal direction of the main portion 32.

A pair of principal plane contact portions 44, 44 that bulge further outward in the thickness direction (direction Z) than other parts are formed in the principal planes 32c, 32c. The principal plane contact portions 44, 44 are separated in the cross direction (direction Y) by the recesses 32d, 32d. The principal plane contact portions 44, 44 are formed over the entire longitudinal direction (direction X) of the main portion 32.

As shown in FIGS. 5 and 6, the first main portion 31 is placed between the flange portion 12 and the guide protrusion 17 in plan view. The second main portion 32 is placed between the ring-like wall portion 14 and the guide protrusion 17 in plan view.

The outer end contact portions 41, 41 of the first main portion 31 abut on the inner surface 12a of the flange portion 12. The outer end contact portions 42, 42 of the second main portion 32 abut on the inner surface 14a of the ring-like wall portion 14.

The main portions 31, 32 abut on the flange portion 12 and the ring-like wall portion 14 not on the entire outer end surfaces 31a, 32a, but on the outer end contact portions 41, 42. Hence, resistance when assembling the partition member 3 onto the ring-like passage 13 is reduced, and assembly is facilitated.

Of the principal plane contact portions 43, 44 of the main portions 31, 32, the principal plane contact portions 43, 44 on the one principal plane 31c, 32c side abut on the inner peripheral surface 9a of the tubular portion 9. The principal plane contact portions 43, 44 on the other principal plane 31c, 32c side abut on the outer peripheral surface 11a of the cylindrical portion 11.

A thickness T1 of the main portions 31, 32 shown in FIG. 3 is preferably larger than a thickness dimension T2 of the ring-like passage 13 shown in FIG. 4. With this, the main portions 31, 32 are compressed in the thickness direction, and are tightly adhered to the tubular portion 9 of the housing 2 and the cylindrical portion 11 of the stator holder 5 by elasticity of an exterior member 37 (elastic material). This improves the straightening effect.

In this case, the main portions 31, 32 abut on the tubular portion 9 of the housing 2 and the cylindrical portion 11 of the stator holder 5 not only on the principal plane contact portions 43, 44, but on a wider area of the principal planes 31c, 32c (e.g., entire surface of principal planes 31c, 32c).

A length L1 of the partition member 3 shown in FIG. 3 is preferably larger than the distance W1 between the flange portion 12 and the ring-like wall portion 14 shown in FIG. 4. This allows the partition member 3 to abut on the flange portion 12 and the ring-like wall portion 14 while being compressed in the longitudinal direction. Hence, elasticity of the external member 37 (elastic material) keeps the partition member 3 from dropping off the ring-like passage 13.

A length L2 of the first main portion 31 is determined according to the distance W2 between the flange portion 12 and the guide protrusion 17, so that it can be installed between the flange portion 12 and the guide protrusion 17. A length L3 of the second main portion 32 is determined according to a distance W3 between the ring-like wall portion 14 and the guide protrusion 17, so that it can be installed between the ring-like wall portion 14 and the guide protrusion 17.

As shown in FIG. 3, the connection portion 33 has a smaller width dimension than the main portions 31, 32.

Figure 7:
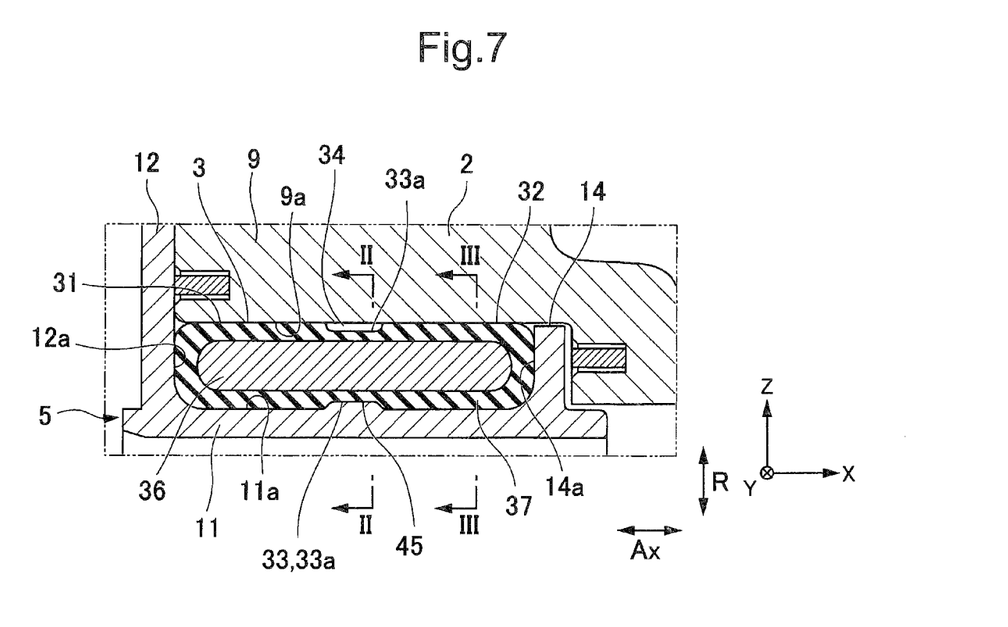
FIG. 7 is a diagram showing the stator holder and the partition member of the rotary electric machine of FIG. 1, and is a I-I section of FIG. 1.

As shown in FIG. 7, a through flow recess 34 (through flow part) that allows passage of the cooling medium M is formed in the connection portion 33. The through flow recess 34 is formed on one principal plane 33a of the connection portion 33 over the entire cross direction (direction Y). Dimensions of the through flow recess 34 in direction X and direction Z (depth) are determined such that the cooling medium M can flow through the through flow recess 34 in the circumferential direction. The through flow recess 34 connects spaces on one and the other side of the partition member 3 in the circumferential direction in the space inside the ring-like passage 13, to thereby allow passage of the cooling medium M between the spaces on the one and other side.

The other principal plane 33a (lower surface in FIG. 7) of the connection portion 33 on the stator holder 5 side is an edge contact portion 45 that abuts on the outer peripheral surface 11a of the cylindrical portion 11.

As shown in FIG. 5, apart of the connection portion 33 engages with the cutout 18, whereby the partition member 3 is restricted from moving in the circumferential direction.

As shown in FIG. 6, parts of side surfaces 33b, 33b of the connection portion 33 that abut on the inner surface 18a of the cutout 18 are side surface contact portions 46.

As shown in FIG. 3, a width W4 of the connection portion 33 is preferably larger than a width W5 of the cutout 18. This allows the connection portion 33 to abut on the inner surface 18a of the cutout 18 while being compressed in the cross direction. Hence, elasticity of the external member 37 (elastic material) keeps the partition member 3 from dropping off the ring-like passage 13.

Figure 8:
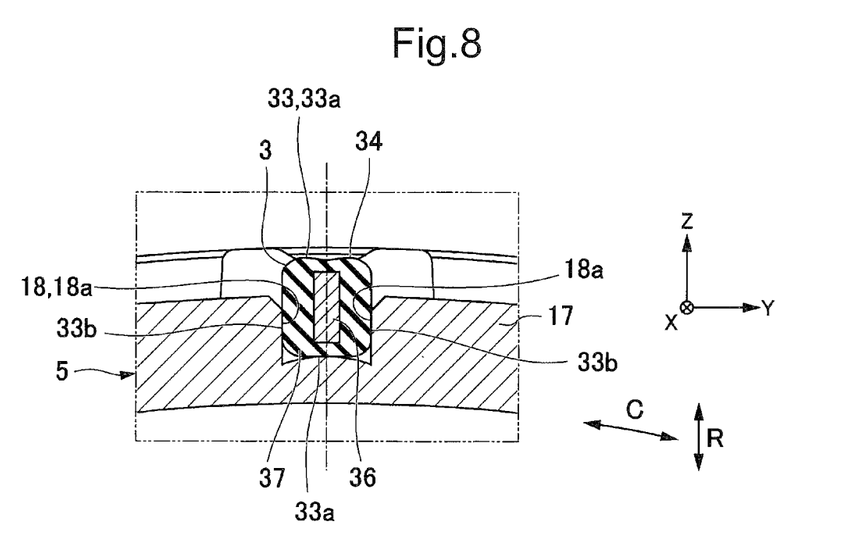
FIG. 8 is a diagram showing the stator holder and the partition member of the rotary electric machine of FIG. 1, and is a II-II section of FIG. 7.

As shown in FIGS. 7 to 9, the partition member 3 is formed of a core member 36 (hard member) and the external member 37 covering the entire surface of the core member 36, for example.

The core member 36 is formed into a long plate, for example. The core member 36 is provided such that its longitudinal direction extends along direction X, and its thickness direction extends along direction Y, for example. The length of the core member 36 preferably extends from the first main portion 31 to the second main portion 32, through the connection portion 33.

The core member 36 is preferably made of metal such as stainless steel and aluminum, and has sufficient stiffness.

The external member 37 is made of an elastic material that has lower hardness than the core member 36.

Materials containing a rubber material, thermoplastic elastomer, and the like may be used as the elastic material. Examples of a rubber material include silicone rubber, isoprene rubber, nitrile butadiene rubber, ethylene propylene rubber, and ethylene propylene diene rubber. Examples of thermoplastic elastomer include styrene-based elastomer, olefin-based elastomer, polyester-based elastomer, and polyurethane-based elastomer. Hardness of the Type A Durometer conforming to JIS K 6253 is an example of a hardness scale. Hardness of the external member 37 of the Type A Durometer is 30-80, for example.

The entire outer surface of the partition member 3 is made of the external member 37.

Since the partition member 3 has the core member 36, mechanical strength of the partition member 3 can be improved. Hence, the partition member 3 can surely interfere with and straighten the flow of the cooling medium M.

Since the outer surface of the partition member 3 is made of the external member 37, parts of the partition member 3 that abut on the inner surface of the ring-like passage 13 are all made of the elastic material.

The partition member 3 preferably has a shape symmetrical in the longitudinal direction (direction X). A shape symmetrical in the longitudinal direction (direction X) is a shape symmetrical with respect to a center plane P1, which is a YZ plane passing through the center of the longitudinal direction (direction X) of the partition member 3 as in FIG. 6, for example. When the partition member 3 is installed in the ring-like passage 13, its longitudinal direction (direction X) coincides with the axis center direction. Hence, the partition member 3 is a shape symmetrical in the axis center direction.

If the partition member 3 has a shape symmetrical in the longitudinal direction (direction X), when the direction of the partition member 3 in the longitudinal direction (direction X) is reversed from that in FIG. 6, the first main portion 31 is placed between the ring-like wall portion 14 and the guide protrusion 17, and the second main portion 32 is placed between the flange portion 12 and the guide protrusion 17. Since the main portions 31, 32 are allowed to abut on the ring-like wall portion 14 and the flange portion 12, respectively, the partition member 3 can properly exert its function.

Since the partition member 3 can thus be installed in the ring-like passage 13 regardless of its orientation in the longitudinal direction (direction X), the partition member 3 is less likely to be assembled erroneously.

The partition member 3 preferably has a shape symmetrical in the thickness direction (direction Z). A shape symmetrical in the thickness direction (direction Z) is a shape symmetrical with respect to an XY plane passing through the center of the thickness direction (direction Z) of the partition member 3, for example. When the partition member 3 is installed in the ring-like passage 13, its thickness direction (direction Z) coincides with the radial direction. Hence, the partition member 3 is a shape symmetrical in the radial direction.

If the partition member 3 has a shape symmetrical in the thickness direction (direction Z), the partition member 3 can properly exert its function regardless of which of the principal planes is directed radially inward.

Since the partition member 3 can thus be installed in the ring-like passage 13 regardless of its orientation in the thickness direction (direction Z), the partition member 3 is less likely to be assembled erroneously.

The partition member 3 preferably has a shape symmetrical in at least one (preferably both) of the longitudinal direction (direction X) and the thickness direction (direction Z).

As shown in FIG. 2, the partition member 3 is provided in the second channel C2, which is the shorter channel of the first channel C1 and the second channel C2 of the ring-like passage 13.

Since the partition member 3 abuts on the inner surface of the ring-like passage 13, the ring-like passage 13 is partially closed in the second channel C2. This allows the cooling medium to flow through the first channel C1, which is the longer channel, so that cooling efficiency can be improved.

The partition member 3 may be installed in the ring-like passage 13 in a freely detachable manner.

As shown in FIG. 4, a ring-like recess 52 extending along the circumferential direction is formed in a principal plane 51 of the housing 2 that faces the inner surface 12a of the flange portion 12. An elastic flange portion-seal member 53 is provided inside the ring-like recess 52. The flange portion-seal member 53 is made of the aforementioned elastic material, for example. The flange portion-seal member 53 abuts on an inner surface of the ring-like recess 52 and the inner surface 12a of the flange portion 12, and closes a gap between the housing 2 and the flange portion 12.

A ring-like recess 55 extending along the circumferential direction is formed in an inner surface 54 of the housing 2 that faces an outer surface 14b of the ring-like wall portion 14.

An elastic ring-like wall portion-seal member 56 is provided between the inner surface 54 of the housing 2 and the outer surface 14b of the ring-like wall portion 14. The ring-like wall portion-seal member 56 is made of the aforementioned elastic material, for example. The ring-like wall portion-seal member 56 abuts on an inner surface of the ring-like recess 55 and the outer surface 14b of the ring-like wall portion 14, and closes a gap between the housing 2 and the ring-like wall portion 14.

Next, a method of use of the rotary electric machine 10 will be described.

As shown in FIG. 2, the cooling medium M is supplied through an admission line 25. The cooling medium M is not particularly limited as long as it is a liquid, and may be a liquid such as cooling oil and cooling water, or may be a gas.

The cooling medium M supplied through the admission line 25 flows through the admission passage 21, passes through the admission opening 23, and is guided into the ring-like passage 13.

The partition member 3 is provided in the second channel C2, and therefore interferes with the flow of the cooling medium M passing through the second channel C2 in the second circumferential direction D2. Hence, most of the cooling medium M flows through the first channel C1 along the first circumferential direction D1. The cooling medium M having passed through the first channel C1 and reached the discharge opening 24 flows into the discharge passage 22, and is discharged through a discharge line 26.

Since the partition member 3 has the through flow recess 34, a part of the cooling medium M (cooling medium M1 in FIG. 2) flows in the second circumferential direction D2 through the through flow recess 34, and heads toward the discharge opening 24. Hence, it is possible to prevent the cooling medium M from being retained in the second channel C2. This can prevent deterioration in the cooling effect due to a retained high-temperature cooling medium M.

Since the external member 37 of the partition member 3 of the rotary electric machine 10 is configured of the elastic material, the partition member 3 is kept from dropping off the ring-like passage 13 by the elasticity. Also, since the partition member 3 is less likely to move relative to the ring-like passage 13, it is possible to prevent deterioration of the partition member 3 due to wear or the like, even when it is subjected to vibration, or upon pressure variation of the cooling medium M. Hence, it is possible to surely interfere with and straighten the flow of the cooling medium M in the second channel C2. Accordingly, the cooling medium M can be guided to the first channel C1 efficiently, and the cooling effect can be improved.

Furthermore, since the partition member 3 can be assembled by being elastically deformed such that it is compressed in the longitudinal direction (direction X), and be fitted into the ring-like passage 13, for example, assembly of the partition member 3 can be facilitated.

Also, even when the ring-like passage 13 is deformed by press-fitting of the stator 1, welding of the housing 2 or the like, elasticity of the elastic material can surely bring the partition member 3 into contact with the inner surface of the ring-like passage 13. Hence, the cooling medium M can be efficiently guided to the first channel C1, so that an excellent cooling effect can be achieved.

In the rotary electric machine 10, the cutout 18 into which the connection portion 33 of the partition member 3 is fitted is formed in the guide protrusion 17. Hence, circumferential movement of the partition member 3 is restricted. This ensures interference with and straightening of the flow of the cooling medium M.

Since the cutout 18 is formed in the guide protrusion 17, the partition member 3 can be kept from shifting or dropping off, and therefore can be positioned accurately. Also, since movement of the partition member 3 can be restricted near the center of gravity, the partition member 3 can be kept from shifting or dropping off.

Since parts (e.g., contact portions 41 to 46) of the partition member 3 that abut on the inner surface of the ring-like passage 13 are made of the external member 37 (elastic material), the aforementioned effects of detachment prevention, prevention of deterioration due to wear, and straightening can be enhanced. The configuration is also advantageous in that assembly can be facilitated.

Note that the invention is not limited to the aforementioned embodiment, and various design changes can be made without departing from the gist of the invention.

Although the ring-like passage 13 is formed between the outer peripheral surface of the stator holder 5 and the inner peripheral surface of the housing 2 in the rotary electric machine 10 of the embodiment, the configuration of the ring-like passage is not limited to this. The ring-like passage only needs to be formed on the outer peripheral side of the stator along the circumferential direction of the stator, and therefore may be formed between the stator holder and a tubular surrounding member other than the housing, for example.

Although the parts of the partition member that abut on the inner surface of the ring-like passage are preferably made of the elastic material, the invention is not limited to this, and may be formed differently, as long as at least some of the parts are configured of the elastic material. Although a part (external member 37) of the partition member 3 is configured of the elastic material in the rotary electric machine 10 of the embodiment, the entire partition member may be configured of the elastic material.

The shape of the locking part formed in the ring-like passage is not limited, as long as it is configured to engage with the partition member to restrict movement thereof. For example, the locking part may be a protrusion protruding radially outward from a bottom surface of the ring-like passage, or may be a protrusion or a stepped portion formed in the guide protrusion.

Although the through flow recess 34 that allows passage of the cooling medium M is formed in the partition member 3 in the rotary electric machine 10 of the embodiment, the configuration allowing passage of the cooling medium M is not limited to this, and may be a hole formed in the partition member.

Although the partition member 3 is provided in the second channel C2, which is the shorter channel of the first channel C1 and the second channel C2 of the ring-like passage 13, the partition member may be provided in any of the channels if the two channels in the circumferential direction are of the same lengths.

Although the partition member 3 does not close the ring-like passage 13 completely because of the through flow recess 34, the partition member may close the ring-like passage completely.

The ring-like passage only needs to be formed over the circumferential direction of the stator, and therefore does not have to strictly follow the circumferential direction of the stator.

According to a first embodiment of a present invention, a rotary electric machine includes: an annular stator (e.g., stator 1 of embodiment); a ring-like passage (e.g., ring-like passage 13 of embodiment) through which a cooling medium (e.g., cooling medium M of embodiment) flows in a circumferential direction of the stator on an outer peripheral side of the stator; and an admission opening (e.g., admission opening 23 of embodiment) and a discharge opening (e.g., discharge opening 24 of embodiment) of the cooling medium connected to the ring-like passage. The admission opening and the discharge opening are provided in different positions in the circumferential direction; in the ring-like passage, a partition member (e.g., partition member 3 of embodiment) that interferes with at least a part of the flow of the cooling medium is provided in a shorter channel (e.g., second channel C2 of embodiment), of channels (e.g., first channel C1 and second channel C2 of embodiment) in one and the other of the circumferential direction directed toward the discharge opening from the admission opening; and the partition member is at least partially configured of an elastic material, and abuts on an inner surface of the ring-like passage.

According to a second embodiment, the ring-like passage has a locking part (e.g., cutout 18 of embodiment) that engages with the partition member, and restricts movement of the partition member inside the ring-like passage.

According to a third embodiment, the ring-like passage has a guide protrusion (e.g., guide protrusion 17 of embodiment) that protrudes from an inner surface of the ring-like passage, and is formed along the circumferential direction, and the locking part is formed in the guide protrusion.

According to a fourth embodiment, the partition member has a through flow part (e.g., through flow recess 34 of embodiment) that connects spaces on one and the other side of the partition member in the circumferential direction in a space inside the ring-like passage, to thereby allow passage of the cooling medium between the spaces on one and the other side.

According to a fifth embodiment, a part of the partition member is configured of a hard member (e.g., core member 36 of embodiment) having a higher hardness than the elastic material.

According to a sixth embodiment, the partition member has a shape symmetrical in at least one of an axis center direction and a radial direction of the stator.

According to the first embodiment, since the partition member is at least partially configured of the elastic material, the partition member is kept from dropping off the ring-like passage by the elasticity. Also, since the partition member is less likely to move relative to the ring-like passage, it is possible to prevent deterioration of the partition member due to wear or the like, even when it is subjected to vibration, or upon pressure variation of the cooling medium. Hence, it is possible to surely interfere with and straighten the flow of the cooling medium in the shorter channel. Accordingly, the cooling medium can be guided to the longer channel efficiently, and the cooling effect can be improved.

Furthermore, since the partition member can be assembled by being elastically deformed and fitted into the ring-like passage, assembly of the partition member can be facilitated.

Also, even when the ring-like passage is deformed by press-fitting of parts or heat distortion from welding, for example, elasticity of the elastic material can surely bring the partition member into contact with the inner surface of the ring-like passage. Hence, the cooling medium can be efficiently guided to the longer channel, so that an excellent cooling effect can be achieved.

According to the second embodiment, since movement of the partition member is restricted, interference with and straightening of the flow of the cooling medium can be ensured.

According to the third embodiment, the partition member can be kept from shifting or dropping off, and therefore can be positioned accurately.

According to the fourth embodiment, the cooling medium can be kept from being retained in the shorter channel. Hence, it is possible to prevent deterioration in the cooling effect due to a retained high-temperature cooling medium.

According to the fifth embodiment, mechanical strength of the partition member can be improved. Hence, the partition member can surely interfere with and straighten the flow of the cooling medium.

According to the sixth embodiment, the partition member can properly exert its function even if it is reversed in the axis center direction or radial direction. Since the partition member can be installed regardless of the orientation, the partition member is less likely to be assembled erroneously.

Obviously, numerous modifications and variations of the present invention are possible in light of the above teachings. It is therefore to be understood that within the scope of the appended claims, the invention may be practiced otherwise than as specifically described herein.

What is claimed is:

1. A rotary electric machine comprising:
an annular stator;
a ring-shaped passage through which a cooling medium flows about a circumference of said stator on an outer peripheral side of said stator; and
an admission opening and a discharge opening of said cooling medium connected to said ring-shaped passage, wherein:
said admission opening and said discharge opening are provided at different positions about the circumference;
said ring-shaped passage having a first channel portion that extends from said admission opening to said discharge opening in a first circumferential direction about the circumference of the stator, said ring-shaped passage having a second channel portion that extends from said admission opening to said discharge opening in a second circumferential direction about the circumference of said stator, the second circumferential direction being opposite to the first circumferential direction, said second channel portion being shorter than said first channel portion;
a partition member is provided in said second channel portion of said ring-shaped passage, said partition member interferes with at least a part of the flow of said cooling medium flowing through said second channel portion from said admission opening to said discharge opening in the second circumferential direction;
said partition member is at least partially configured of an elastic material, and abuts an inner surface of said ring-shaped passage; and
said partition member has a main body that longitudinally extends in parallel to an axis center direction of the stator, said main body has a recess that extends in a direction along the circumference of said stator and allows said cooling medium to flow through said second channel portion from said admission opening to said discharge opening in the second circumferential direction.

2. The rotary electric machine according to claim 1, wherein
said ring-shaped passage has a locking part that engages with said partition member, and restricts movement of said partition member inside the ring-shaped passage.

3. The rotary electric machine according to claim 2, wherein:
said ring-shaped passage has a guide protrusion that protrudes from an inner surface of said ring-shaped passage, and is formed along the circumference; and
said locking part is formed in said guide protrusion.

4. The rotary electric machine according to claim 1, wherein
said partition member has a through flow part that connects spaces on opposite sides of said partition member about the circumference inside said ring-shaped passage, to thereby allow passage of said cooling medium between said spaces on the opposite sides of said partition member.

5. The rotary electric machine according to claim 1, wherein
a part of said partition member is configured of a hard member having a higher hardness than said elastic material.

6. The rotary electric machine according to claim 1, wherein
said partition member has a shape symmetrical in at least one of the axis center direction and a radial direction of said stator.

7. A rotary electric machine comprising:
a stator having an outer periphery;
a passage which is provided around the outer periphery and through which a cooling medium is to flow;
an inlet opening which is connected to the passage and via which the cooling medium is to be supplied to the passage;
an outlet opening which is connected to the passage and via which the cooling medium is to be discharged from the passage, the inlet opening and the outlet opening divide the passage into a longer passage and a shorter passage shorter than the longer passage, the longer passage and the shorter passage connecting the inlet opening and the outlet opening, respectively; and
a partition provided in the shorter passage and comprising an elastic material to contact with an inner surface of the shorter passage so as to restrict a flow of the cooling medium, wherein
the partition has a main body that longitudinally extends in parallel to an axis center direction of the stator, the main body has a recess that extends in a direction along a circumference of the stator and allows the cooling medium to flow through the shorter passage from the inlet opening to the outlet opening.

8. The rotary electric machine according to claim 7, wherein
the passage has a locking part that engages with the partition, and restricts movement of the partition inside the passage.

9. A rotary electric machine comprising:
a stator having an outer periphery;
a passage which is provided around the outer periphery and through which a cooling medium is to flow;
an inlet opening which is connected to the passage and via which the cooling medium is to be supplied to the passage;
an outlet opening which is connected to the passage and via which the cooling medium is to be discharged from the passage, the inlet opening and the outlet opening divide the passage into a longer passage and a shorter passage shorter than the longer passage, the longer passage and the shorter passage connecting the inlet opening and the outlet opening, respectively; and a partition provided in the shorter passage and comprising an elastic material to contact with an inner surface of the shorter passage so as to restrict a flow of the cooling medium, wherein:

the passage has a locking part that engages with the partition, and restricts movement of the partition inside the passage;

the passage has a guide protrusion that protrudes from an inner surface of the passage, and is formed along a circumferential direction of the stator; and the locking part is formed in the guide protrusion.

10. The rotary electric machine according to claim 7, wherein the partition has a through flow part that connects spaces on opposite sides of the partition in a circumferential direction of the stator inside the passage, to thereby allow passage of the cooling medium between the spaces on the opposite sides of the partition.

11. The rotary electric machine according to claim 7, wherein a part of the partition is configured of a hard member having a higher hardness than the elastic material.

12. The rotary electric machine according to claim 7, wherein the partition has a shape symmetrical in at least one of the axis center direction and a radial direction of the stator.

13. The rotary electric machine according to claim 7, wherein the stator has an annular shape.

14. The rotary electric machine according to claim 7, wherein the passage has a ring shape.

* * * * *